(No Model.)
J. W. McCONNEL & J. HIGGINSON, Jr.
APPARATUS FOR GRINDING FLATS FOR REVOLVING CARDING ENGINES.
No. 426,416. Patented Apr. 22, 1890.
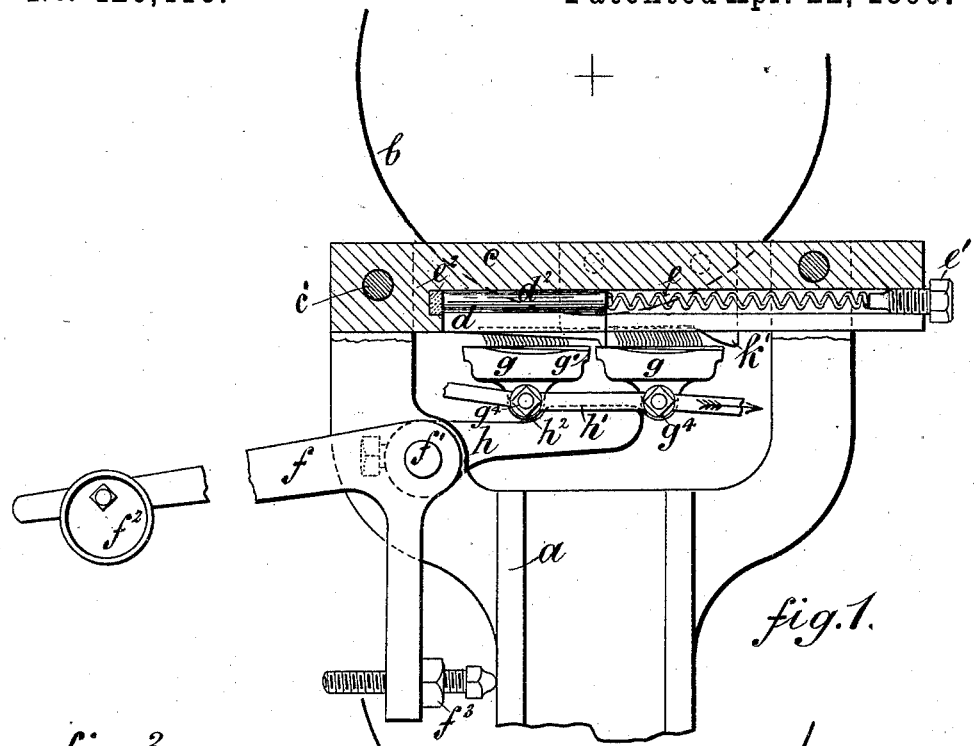
fig. 1.
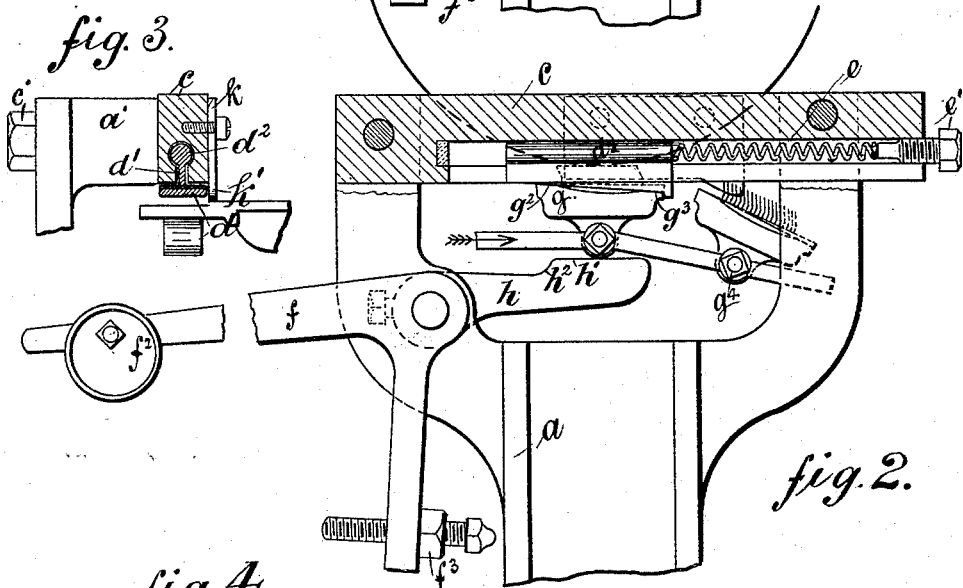
fig. 3.
fig. 2.
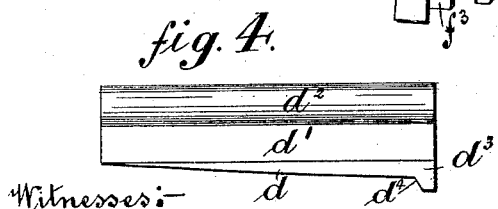
fig. 4.
Witnesses:
Alexander Gardner
Carl Bollé
Inventors
John W. McConnel
Joseph Higginson, Jr.
by their Attorney
W. T. Emmett

UNITED STATES PATENT OFFICE.

JOHN W. McCONNEL AND JOSEPH HIGGINSON, JR., OF MANCHESTER, COUNTY OF LANCASTER, ENGLAND.

APPARATUS FOR GRINDING FLATS FOR REVOLVING CARDING-ENGINES.

SPECIFICATION forming part of Letters Patent No. 426,416, dated April 22, 1890.

Application filed August 12, 1889. Serial No. 320,549. (No model.) Patented in England May 3, 1888, No. 6,599.

*To all whom it may concern:*

Be it known that we, JOHN WANKLYN MCCONNEL, cotton-spinner, and JOSEPH HIGGINSON, Jr., manager, both subjects of the Queen of Great Britain, and residents of Manchester, in the county of Lancaster, England, have invented certain new and useful Improvements in Apparatus for Grinding the Flats of Revolving-Flat Carding-Engines, (for which Letters Patent for Great Britain, numbered 6,599, and dated May 3, 1888, have been granted to us,) of which the following is a specification.

Our invention relates to apparatus for grinding the flats of revolving-flat carding-engines while said flats are supported on their working-surfaces upon wedges sliding on guides under the grinding-roller in a similar manner as in the apparatus for which Letters Patent were granted to Thomas Clegg and Thomas Lucas, dated the 19th of February, 1874, and numbered 623.

Our improvements consist in means for compelling the flats to release the wedges as soon as the wires have been ground and for facilitating this release and in so arranging the slides that they do not become clogged with fluff and dirt, which would impede their free movement and impair the accuracy of the grinding.

On the sheet of drawings appended hereunto, Figure 1 shows a side view, partly in section of our improved apparatus with the flats in the positions they occupy before and after they are ground; Fig. 2, a similar side view with one of the flats in the position it occupies while being ground; Fig. 3, a cross-section through the guide and sliding wedge; Fig. 4, an enlarged side view of the wedge.

The apparatus as arranged on one side of the carding-engine only is shown, that on the other side being exactly similar.

Our improved apparatus is attached to a forked bracket $a$, replacing the ordinary under bracket for the grinding-roller $b$. This bracket has bosses $a'$ cast upon each end, to which the guide $c$ is attached by screws $c'$.

One of our improvements consists in making the guide $c$ hollow or tubular, with a narrow split at the bottom, through which the web $d'$, connecting the wedge $d$ with the slide $d^2$, passes. The wedge is made broad, as shown, so as to have a good bearing upon the guide $c$.

The slide $d^2$ may be made round, as shown on the drawings, or square or polygonal, the tubular slide being made of corresponding shape, and the latter may be made in parts bolted or screwed together instead of solid, as shown on the drawings. A spring $e$ is inserted into the tube and kept in its place by a screw $e'$ and presses the sliding wedge $d$ against a stop formed by not extending the tubular bore and slit quite to the end of the guide $c$ and leaving one end solid, as shown by the drawings, a piece of india-rubber or leather $e^2$ being inserted to mitigate the shock. By this arrangement of guide and sliding wedge the sliding surfaces are protected against the accumulation of fluff and dirt on said surfaces.

Below the guide $c$ we arrange a lever $h$, or its equivalent, said lever being fixed upon a short shaft $f'$, oscillating in the bracket $a$ and having fixed upon its other end a lever $f$, loaded at the end with a weight $f^2$, or its equivalent, which holds the levers in the position shown on Fig. 1 when there is no flat between the lever $h$ and the wedge $d$, an adjustable screw $f^3$ forming a stop against the grinding-bracket. Below the guide $c$ the lever $h$ has a face $h'$ of about the same width as a card-fillet centrally below the grinding-roller and a short incline $h^2$ in front of it. One such apparatus as hereinbefore described is arranged on each side of the carding-engine.

$g$ $g$ are two flats connected, as usual, by links and traveling in the direction of the arrow on their return above the carding-engine. As the flats travel along the lug $g^4$ of each flat on coming against the incline $h^2$ is lifted up and the flat pressed against the wedge $d$ by the lever. The corner $g'$ of the flats seizes the projection $d^3$, Fig. 4, of the wedge and carries it along with it under the grinding-roller, as shown on Fig. 2. The wedge and guide are arranged above those parts $g^2$ $g^3$ of the flats with which they travel on the bend of the carding-engine while working, and as the same wedge is interposed between the guide and these surfaces in all the flats all are ground at exactly the same inclination to their working-surfaces, and irregularity of wear on these surfaces will have no effect upon the correctness of the inclination of the surface of the wires when in its working position on the carding-cylinder.

The surface of the wedge on which the flats bear is curved to the same radius as the bend on which the flats travel when working, as shown by Fig. 4. When the lug $g^4$ of the flat has passed the face $h'$, it can drop off the lever $h$; but its weight has in practice been found insufficient to cause it to do so quickly enough for the spring to return the wedge $d$ into the position shown on Fig. 1, ready for the next following flat. We facilitate the liberation of the wedge by making the projection seized by the flat inclined to the guide, as shown at $d^4$ on Fig. 4, and make the part of the flats seizing the projection of corresponding shape, whereby the release of the wedge by the flats is greatly facilitated. However, one of these parts only may be made inclined and the other square, if preferred. In addition to this, we apply means for forcing the flat away from the wedge as soon as the lug on its back has reached the end of the lever $h$. This may be done, as shown on the drawings, by attaching to the inside of the guide $c$ a plate $k$, having an inclined projection $k'$, against which the flat comes as soon as the lug on its back has passed over the face $h'$, and which forces it down and causes it to release the wedge $d$.

We claim—

1. In apparatus for grinding the flats of carding-engines, in combination with sliding wedges $d$, against which the working-surfaces of said flats are held, tubular guides $c$, with slits and flat under sides for guiding said wedges.

2. Sliding wedges $d$, connected by webs $d'$ to slides $d^2$, sliding inside tubular guides $c$ and formed with projections $d^3$, inclined at an obtuse angle to the under side of said guides $c$, for the purpose specified.

3. Fixed plates $k$, with inclines $k'$, for forcing the flats of revolving-flat carding-engines after they are ground out of contact with the sliding wedges on which they are held while being ground.

4. The combination, with a forked bracket $a$, weighted lever $f$, shaft $f'$, and lever $h$, of a tubular slit-guide $c$, a wedge $d$, sliding on said guide, a spring $e$, and a plate $k$, with incline $k'$, substantially as shown and described, and for the purposes specified.

In testimony that we claim the foregoing as our invention we have signed our names, in presence of two witnesses, this 31st day of May, 1889.

JOHN W. McCONNEL.
JOSEPH HIGGINSON, JUNIOR.

Witnesses:
    JOHN WILLIAM KAY,
        Clerk, 6 Waugh St., Manchester.
    SIDNEY STEWART,
        Clerk, 113 Heaviley, Stockport.